US006401779B1

(12) United States Patent
Riva et al.

(10) Patent No.: US 6,401,779 B1
(45) Date of Patent: Jun. 11, 2002

(54) TIRE WITH ZERO-DEGREE, METAL REINFORCING STRAP MADE OF A SHAPE-MEMORY ALLOY

(75) Inventors: Guido Riva, Milan (IT); Gurdev Orjela, Arlon (BE); Maurizio Boiocchi, Segrate (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/427,707

(22) Filed: Oct. 27, 1999

Related U.S. Application Data
(60) Provisional application No. 60/106,631, filed on Nov. 2, 1998.

(30) Foreign Application Priority Data

Oct. 28, 1998 (EP) .................................................. 120356

(51) Int. Cl.$^7$ ............................. B60C 9/18; B29D 30/38
(52) U.S. Cl. ...................... 152/527; 152/531; 152/536; 152/451; 148/563; 148/402
(58) Field of Search ................................ 152/526, 531, 152/538, 527, 536, 451; 57/902; 148/402, 563

(56) References Cited

U.S. PATENT DOCUMENTS

| | | | | | |
|---|---|---|---|---|---|
| 3,667,529 | A | * | 6/1972 | Mirtain | ........................ 152/361 |
| 4,011,899 | A |   | 3/1977 | Chamberlin | |
| 5,082,713 | A | * | 1/1992 | Gifford | ........................ 428/107 |
| 5,242,002 | A | * | 9/1993 | Oku | ............................ 152/527 |
| 6,158,690 | A | * | 12/2000 | Wadey | ..................... 244/17.27 |
| 6,237,663 | B1 | * | 5/2001 | Cipparrone | ................. 152/527 |

FOREIGN PATENT DOCUMENTS

| EP | 0 290 328 A | 11/1988 |
|---|---|---|
| GB | 1 524 294 A | 9/1978 |
| JP | 04-362401 | 12/1992 |
| JP | 04362401 | * 12/1992 |

OTHER PUBLICATIONS

J. Cederstrom et al., "Relationship Between Shape Memory Material Properties and Applications", Journal De Physique IV, C2, pp. 335–341, 1995.*
Samuel Clark, Mechanics of Pneumatic Tires, p. 881, 1981.*
I. Masanori, "Tire," Patent Abstracts of Japan, vol. 017, No. 237, of JP 04–362,401 (May 13, 1993).
C.M. Wayman et al.; "An Introduction to Martensite and Shape Memory", Engineering Aspects of Shape Memory Alloys, published by Butterworth–Heinemann, London (Ed.T.W. Duerig), pp. 3–21, 1990.
Y. Suzuki et al.; "Fatigue Properties of Ni–Ti Shape Memory Alloys", Engineering Aspects of Shape Memory Alloys, published by Butterworth–Heinemann, London (Ed.T.W. Duerig), pp. 256–259, 1990.
G.R. Zadno et al.; "Linear Superelasticity in Cold–Worked Ni–Ti", Engineering Aspects of Shape Memory Alloys, published by Butterworth–Heinemann, London (Ed.T.W. Duerig), pp. 414–419, 1990.
Masanori, "Tire" Patent Abstracts of Japan, vol. 017, No. 237 of JP 04 362401 (Dec. 15, 1992).

* cited by examiner

Primary Examiner—Michael W. Ball
Assistant Examiner—Justin Fischer
(74) Attorney, Agent, or Firm—Finnegan, Henderson, Farabow, Garrett & Dunner, L.L.P.

(57) ABSTRACT

A tire includes a carcass; a tread band on the carcass; a belt, positioned between the tread band and the carcass, including at least one layer of rubberized fabric; and at least one reinforcing metal strap in the at least one layer of rubberized fabric. The at least one reinforcing metal strap is made of a shape-memory material oriented at about 0° to an equatorial plane of the tire. The at least one reinforcing metal strap has a width of no less than about 1 mm. And the at least one reinforcing metal strap has coils disposed side-by-side in a direction substantially perpendicular to a radius of the tire.

19 Claims, 6 Drawing Sheets

TIRE WITH ZERO-DEGREE, METAL REINFORCING STRAP MADE OF A SHAPE-MEMORY ALLOY

Applicants claim the right of priority under 35 U.S.C § 119 (a)–(d) based on patent application No. 98120356.5, filed Oct. 28, 1998, in the European Patent Office; additionally, Applicants claim the benefit under 35 U.S.C § 119 (e) based on prior-filed, copending provisional application No. 60/106,631, filed Nov. 2, 1998 in the U.S. Patent and Trademark Office.

BACKGROUND OF THE INVENTION

1. Field of the Invention

The present invention refers to rubberized fabrics for tires having zero-degree reinforcing elements and to tires incorporating such fabrics.

2. Description of the Related Art

As is known, a tire includes at least three fundamental components, the carcass, the tread band, and the reinforcing belt between the tread band and the carcass. The carcass, usually at least one ply, is turned out at both ends around a pair of bead cores. Together, the bead cores, the ends of the carcass, and whatever rubberized filler is added between the bead cores and the ends of the carcass cooperate to form the beads on either side of the tire.

When in use, a tire is placed on a wheel rim, which has two seats axially displaced from one another. The two beads on either side of the tire rest on the two rim seats. Each of the rim seats terminates in an end flange, which has an outermost diameter greater than the diameter of the tire beads, which prevents the beads from slipping off of the wheel rim once the tire is installed on the rim.

The belts of a conventional tire generally consist of at least three rubberized fabrics. The first two fabrics comprise fine cords that crisscross each other and are both angled with respect to the equatorial plane of the tire. The third fabric is external radial belt made from fine cords of heat-shrinkable material including synthetic fibers, oriented at 0° with respect to the equatorial plane of the tire, such as commonly nylon. In one common embodiment, the third layer consists of nylon cords 0.39 mm in diameter embedded in a 0.7-mm-thick rubberized fabric.

To form the tread pattern on a tire, an uncured or "green" tire is placed in a mold, which carries on its interior surface the pattern for the tread of the tire. During the tread forming step in the manufacturing process, the mold is pushed into the tire to imprint the tread pattern onto the tire. At the same time, the tire is inflated, causing the layers with crisscrossed cords to expand toward the interior surface of the mold. This expansion helps to push the tread band againsto the surface of the mold so that it can accept the tread pattern from the mold. As the tire expands when inflated, the crisscrossed cords are pushed outwardly, diminishing the angle of inclination of the cords with respect to one another. The third belt layer, with its heat-shrinkable synthetic fiber cords, exerts a force on the layers beneath it to limit their outward movement during the tread-forming stage.

Not only does the third belt layer serve a purpose in the manufacture of a tire, it also is important to the operation of a tire when the tire is mounted on a rim. The third belt layer helps to counteract the outward expansion of the underlying layers, which is caused by the large centrifugal forces that act on the belts at high speeds.

The synthetic fiber cords, however, have at least one disadvantage. They are known to temporarily deform in a tire in a phenomenon known as "flatspotting." When the vehicle is stopped, the entire weight of the car rests on one spot on each of the tires. This causes a flattening of each tire in the footprint or imprint area where the tire contacts the ground. Because the synthetic fibers are prone to creep under stress, they distort in the imprint area. Even after the vehicle begins to move and the tire rotates, the flattened region persists in the imprint area for a prolonged period of time. Such a phenomenon is typical of all synthetic materials. The phenomenon varies from material to material depending on the viscoelastomeric characteristics of the particular synthetic fiber in question. Consequently, at least for a certain period after the tire rotates following flatspotting, the temporary deformation of the synthetic cords generates a noise effect and uncomfortable behavior.

To avoid this phenomenon, it is known to incorporate zero-degree metallic cords (oriented at zero degrees with respect to the equatorial plane of the tire) in the third belt rather than cords of synthetic material. The metallic cords are sufficiently rigid to resist deformation when the vehicle is stopped. Tires made according to this teaching do not exhibit the phenomenon of "flatspotting" because they incorporate metallic cords rather than cords made from a viscoelastic material.

When the third belt layer is constructed with metallic cords, it is known to use cords made of some strands twisted together of the so called "lang lay type" that provides cords with high elongation prior to reaching their breaking point, and, because of this, the cords are also known in the prior art as "HE" (high-elongation) cords. In such an embodiment, the metallic cords act like a spring wire, which is evident from studying a typical stress-deformation diagram for these materials.

The first segment of the stress-deformation diagram for metallic cords is identified by a small or weak slope with respect to the abscissa. This first segment of the stress-deformation diagram is useful because it can be used to predict the behavioral characteristics of the metal during the tread band forming stage where the material exhibits high elongation at low loads. The next, strongly sloped segment of the stress-deformation diagram is useful for determining the behavioral characteristics of the metal during operation of the tire, where the material exhibits only slight elongation under a high load.

The overall diameter of metallic cords suitable for this purpose may be 0.7 mm in a zero-degree fabric used in the manufacturing of large tires. However, such a cord size is too large to be compatible with the dimensions required for a belt fabric in an automobile tire.

Belt structures with metal cords made from shape-memory materials are also known in the art, e.g., U.S. Pat. No. 5,242,002 and Japanese Patent Application JP 4362401. In U.S. Pat. No. 5,242,002, a tire is described with belts having cords symmetrically inclined with respect to the equatorial plane of the tire. The cords are formed by helically winding several wires together. At least one of the wires in the cord is made from a shape-memory material. The shape-memory wire, before being cabled with the other wires, undergoes a heat treatment at a predetermined temperature while it is in a particular configuration (for example undulated) and is subsequently deformed into a linear configuration below the temperature of the heat treatment; accordingly, said wire recover the undulated configuration above the heat treatment temperature.

Each time the temperature of the tread band increases at high speeds, the temperature of the belt exceeds that of the heat treatment of the shape-memory wire, and the wire tends to take on the undulated shape. However, since the shape-memory wire is corded with the other wires, the shape-memory wire cannot deform but, instead, is subject to tension. As a result, in the shape-memory wire, a stress is established, the effect of which is to increase the rigidity of the belt and, accordingly, avoid an increase in the diameter of the tire caused by centrifugal forces.

Japanese Patent Application JP 4362401 discloses a tire with an outermost belt having an outermost layer comprising a shape-memory expansion element, preferably a spring wire element made from a Ni—Ti alloy. The spring wire element is wound at zero degrees over the underlying layers of the belt. The shape-memory element is designed to contract in the peripheral direction of the tire when the wire is heated during high speed use. In this way, at high speeds, the tire becomes more rigid and the phenomenon of tire expansion is controlled. On the other hand, at low speeds, such as those encountered under normal traveling conditions, the shape-memory element returns to and maintains its original shape. The Japanese application describes wires from 0.25 to 0.5 mm in diameter. Finally, the Japanese application discloses that it is not necessary for the shape-memory expansion element in the tire to be spring wire shaped, but that it can be shaped as a belt or cord, for example.

SUMMARY OF THE INVENTION

Confronted with the state of the art set forth above, it was believed possible to provide a single solution both to the problem of flatspotting and to the problem of the outward expansion of the belt when the associated tire is subjected to the large centrifugal forces during high speed use. Furthermore, it was believed that the dimensions of the materials used (and, therefore, the thickness of the belt created) could be kept at least at the levels known in the art, if not reduced.

It was believed that the problems of flatspotting and centrifugal expansion could be addressed simultaneously if zero-degree metal reinforcements were used that exhibited both (1) a correct geometric orientation in the rubberized fabric and (2) a high degree of resistance to fatigue.

One problem that had to be addressed, however, was how to maintain the correct geometric orientation of the reinforcing elements in the rubberized fabric. In the prior art, the reinforcing elements are known to have an uneven distribution in the fabric layer. It is believed that this uneven distribution is caused by the application of high pressure to the tire during the manufacturing process. Specifically, it is believed that the inflation pressure exerts a force on the reinforcing elements that displaces them from their intended positions before the tire solidifies.

Maintaining the correct geometry of the reinforcing elements in the fabric during manufacture is only part of the problem, however, because the cords are also prone to move in the fabric during operation of the tire. In use, the cord coils may compress into the elastomeric material. Since the diameter of the cords is so small, they are believed to act like knives, creating small cuts and tears in the elastomer over time. As a result, over time, the cords begin to move about within the elastomer and, in extreme cases, may even exit the material, creating a risk that the reinforcing elements might contact the metallic reinforcement cords in the immediately underlying layer. If the cords in different layers contact each other, they can generate sufficient friction to compromise the integrity of the tire fabric.

Fatigue stress is another factor that must be considered when designing a reinforced tire fabric. Fatigue stress can be attributed to two particular events as the tire rotates. First, in the undeformed portion of the tire, the radially outermost portion of the cord is subject to traction and assumes a bending deformation proportional to the distance from its neutral longitudinal axis and inversely proportional to the radius of curvature of the undeformed tire. Second, in the transition between the undeformed portion of the tire and the area of imprint, the same portion of the cord is subjected to a deformation force considerably greater than the previous one, since the deformation becomes inversely proportional to the new radius of curvature of the tire, which is noticeably smaller than the radius of curvature corresponding to the undeformed tire geometry. Similarly, the innermost portion of the cord deforms according to the same relationship, a deformation that is proportional to the distance of the considered fiber from the neutral axis and inversely proportional to the radii of curvature assumed by the tire, respectively, first in the undeformed condition and then in the deformed condition in proximity to the area of the imprint.

One way to reduce this fatigue is to reduce the diameter of the cords. While the 0.39 mm nylon cord of the typical reinforcing element may seem small, that dimension is actually quite large when examining the cord from the perspective of the fatigue stress on the cord. However, as the diameter of the cords is reduced, the potential for problems related to the possibility that the cords might cut through the elastomeric material, as discussed above, increases.

Once the various factors associated with the interaction of the reinforcing elements in the rubberized fabric were appreciated in accordance with the development of the present invention, a solution was selected that addressed both the need for the correct placement of the zero-degree reinforcing elements into the incorporating fabric and also the need for a fabric with a high resistance to fatigue. One of the improvements selected was the incorporation of zero-degree reinforcements made of shape-memory alloy in the shape of metal straps. For such a configuration, it was thought that a specific width of the metal strap could be determined and used to stabilize the strap in the elastomeric material. Moreover, it was thought that such a configuration would react differently to the air pressure in the tire and would resist the tendency to cut through the elastomeric material. It was also thought that if the thickness of the metal strap was noticeably smaller than that of the corresponding cords used in the prior art, resistance to fatigue as the tire rolls over the ground could be considerably increased.

Therefore, a first aspect of the present invention is characterized by a rubberized fabric for a tire belt incorporating an elastomeric material with at least one continuous reinforcing metal strap. The strap is made from a shape-memory material that is oriented at 0 degrees to the equatorial plane of the tire. The minimum width of the strap is 1 mm. The maximum thickness of the rubberized fabric is 0.4 mm.

In the first aspect of the present invention, the reinforcing elements are held firmly in place or stabilized in a predetermined position in the rubberized fabric because the reinforcing elements are metal straps disposed in a side-by-side arrangement. The minimum width of the metal straps is 1 mm and the thickness of the rubberized fabric incorporating the metal straps has a maximum thickness of 0.4 mm. Each coil of the metal straps is oriented substantially perpendicularly to the direction of the force from the air pressure inside the tire. With such an orientation, the metal straps resist compression into the rubberized fabric.

Preferably, the fabric includes metal straps between 1 and 5 mm wide and between 0.02 and 0.1 mm thick, inclusive. In a preferred embodiment of the present invention, the thickness of each metal strap is no greater than one tenth of its the minimum width. The metal straps of the present invention are preferably made from a shape-memory material such as a NiTi alloy, a NiTiX alloy, where X is selected from a combination of Fe, Cu, or Nb, a CuZnAl alloy, a CuAlNi alloy, a CuAlBe alloy, a FeNiCoTi alloy, a FeMnSi alloy, an alloy with a FeMnSi-base, or an alloy with a FeNiCo-base. Being made of a shape-memory material, the reinforcing straps, when heated, try to return to a predetermined, memorized length.

In a second embodiment of the present invention, the tire comprises a carcass, a tread band on the carcass, and a belt positioned between the tread band and the carcass including at least one layer of rubberized fabric. The belt incorporates at least one continuous reinforcing metal strap made from a shape-memory material that is oriented at 0° to the equatorial plane of the tire. The metal strap has a minimum width of 1 mm and is wound with coils arranged side-by-side, perpendicularly to the radius of the tire.

In the second embodiment of the present invention, the reinforcing belt is further characterized by including means to stabilize the reinforcing straps in a predetermined position within the fabric. The position of the reinforcing straps is stabilized by shaping the reinforcing elements as side-by-side metal straps, the minimum width of each metal strap being 1 mm and the maximum thickness of the rubberized fabric being 0.4 mm. Each coil of the metal straps is oriented substantially perpendicularly to the direction of the force from the air pressure inside the tire, thereby resisting compression of the reinforcing strap into the elastomeric material in which the reinforcing strap is incorporated. In one preferred embodiment, the metal straps are distributed evenly in the tire with a 0.1 mm separation between adjacent straps.

In yet another preferred embodiment, the metal straps in the fabric tend to recover a previously memorized shape by exerting contractive forces on the innermost fabrics of the belt between two predetermined temperatures, $A_s$ and $A_f$, respectively. $A_s$ corresponds to a temperature at the start of the structural transformation of the metal strap from a martensitic state to an austenitic state. $A_f$ corresponds to a temperature at the completion of the structural transformation of the metal strap from the martensitic state to the austenitic state.

It should be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate several embodiments of the invention, and, together with the general description given above and the detailed description of the embodiments given below, serve to explain the principles of the invention.

In the Drawings.

DESCRIPTION OF THE PREFERRED EMBODIMENTS

Figure 1:
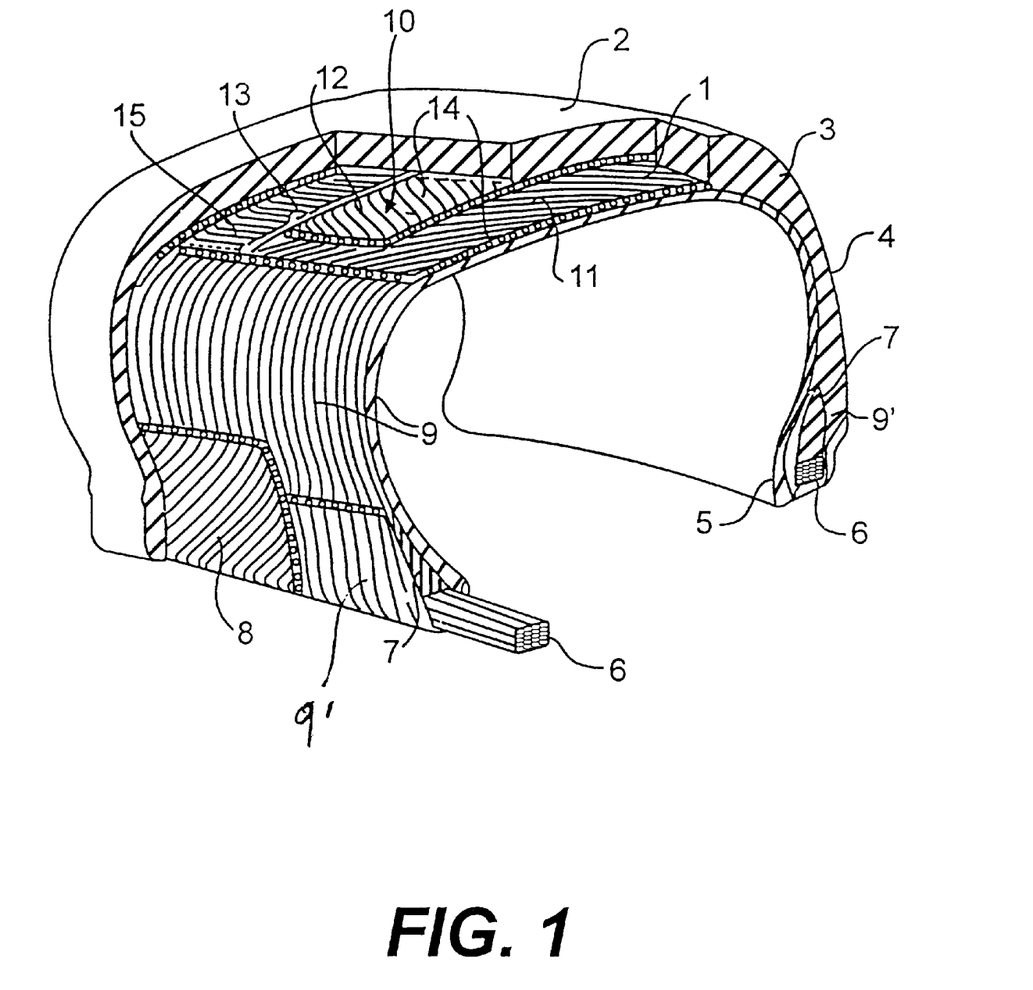
FIG. 1 is a partial perspective view of a portion of a tire according to the present invention with sections removed for purposes of illustration.

FIG. 1 illustrates a radial tire according to the present invention. Tire 1 includes tread band 2, shoulders 3, and sidewalls 4. The ends of tire 1 include a pair of beads 5, bead cores 6, bead filler 7, and reinforcement borders 8. Tire 1 further comprises radial carcass 9 with reinforcing elements arranged in a meridian plane. Tire 1 also includes a belt structure 10 arranged between the carcass 9 and the tread band 2.

Carcass 9 is formed of one or more carcass plies with edges 9' folded outward around bead cores 6. The structure of belt 10 comprises a group of belts formed of three rubberized fabrics 11, 12, 13 incorporating reinforcing elements. The first two radially innermost fabrics 11, 12, which are not considered deformable, comprise steel reinforcement cords 14 inclined at an angle to the equatorial plane of tire 1, so that the respective cords 14 crisscross each other. In one embodiment, respective cords 14 typically crisscross one another at an angle of 50°. Cords 14 may have a construction of the 2+1×0.28 type, a Young's modulus of 200,000 MPa, and a breaking load of 500 N.

The radially outermost fabric 13 comprises continuous reinforcing elements or straps 15 made from a shape-memory material. Reinforcing elements or straps 15 are substantially oriented at an angle of 0° to the equatorial plane of tire 1.

One characteristic of the present invention is that fabric 13 comprises means to stabilize reinforcing elements 15 in the predetermined position where they are incorporated in fabric 13. The position of reinforcing elements 15 is stabilized by shaping the reinforcing elements 15 into metal straps and placing them side-by-side in fabric 13, as is illustrated in the partial cross-section of FIG. 6. In addition, the position of the metal straps 15 is stabilized because each strap 15 lies perpendicular to the direction of the force from the air pressure inside tire 1. The position of each strap 15 is stabilized further because the width of strap 15, designated by the value "L," is at least 1 mm. Both of these characteristics improve the resistance of strap 15 to compression into the elastomeric material in which metal strap 15 is incorporated, as explained above.

Figure 6:
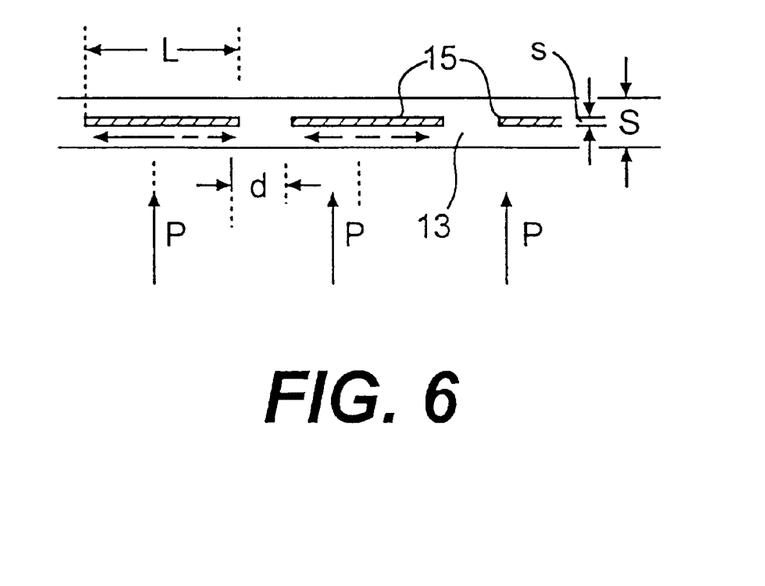
FIG. 6 is a cross-section of a layer of a belt with coils of zero-degree metal straps constructed in accordance with the present invention as may be used in a tire, such as the one shown in FIG. 1.

By way of a specific example of one embodiment of the present invention, the width "L" of metal strap 15 may be 3 mm. In cross-section, the thickness "s" of such a metal strap 15 would be 0.03 mm, and the thickness "S" of the rubberized fabric incorporating the coils of metal strap 15 coils would be 0.3 mm. Distance "d" between the ends of the contiguous metal straps would be between 0.5 and 3 mm.

Given that the at least one reinforcing metal strap has a thickness "s", that the coils are axially displaced from one another a distance "d", and that the at least one layer of rubberized fabric has a thickness "S", a proportional relationship between "s", "d", and "S" may for example, be identified by the following expression:

According to the present invention, metal straps 15 are made of a shape-memory material which can be a metal alloy such as NiTi, NiTiX (where X is Fe, Cu, or Nb), FeNiCoTi, FeMnSi, CuZnAl, CuAlNi, CuAlBe, a FeMnSi-based alloy, or a FeNiCo-based alloy, whose characteristics result from structural transformations effected at determined temperatures characteristic of each alloy. Shape-memory materials of the type contemplated for the present invention are discussed and defined in the publication, "Engineering Aspects of Shape Memory Alloys" published by Butterworth-Heinemann, London (Ed. T. W. Duerig) (1990).

Figure 2:
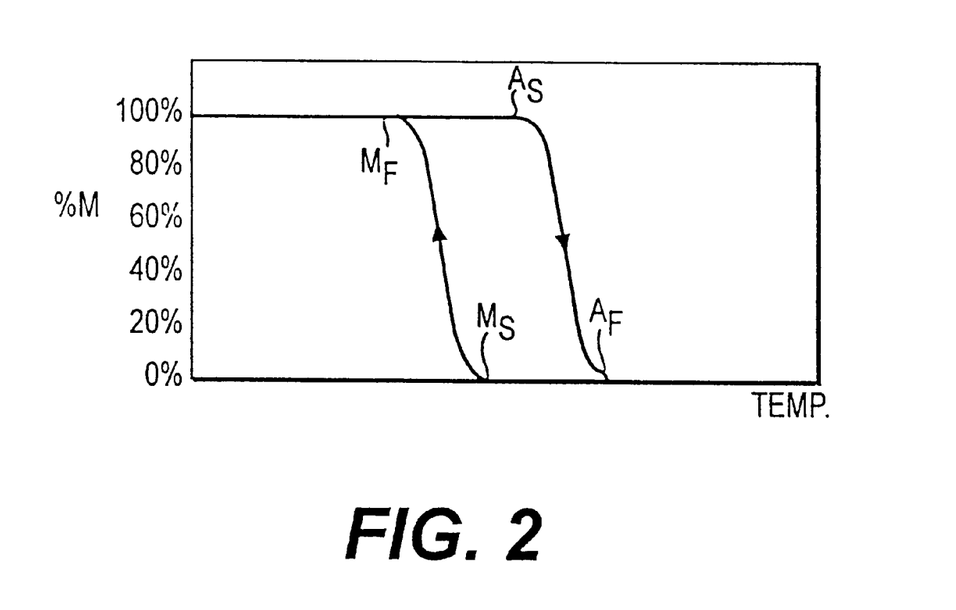
FIG. 2 is a transformation diagram illustrating the structural transformation of the reinforcing metal straps of the present invention as a function of the temperature of the shape-memory material from which the reinforcing metal straps are constructed.

In general, each alloy has its own diagram of transformation from a martensitic state to an austenitic state and vice versa, as a function of specific temperatures, as shown in the graph of FIG. 2. The graph of FIG. 2 schematically reports the hysteresis loop of the percentage of martensite phase "M" as a function of temperature. More particularly, the graph of FIG. 2 shows the passage from a 100% martensitic structure "M" to a totally austenitic structure and vice versa, in the direction indicated by the arrows.

The martensitic to austenitic transformation begins when the temperature of the shape-memory alloy reaches temperature $A_s$ and finishes when the temperature reaches temperature $A_f$. In a cooling phase, the material transforms from an austenitic structure at temperature $A_f$ to a martensitic structure. The martensitic transformation begins at temperature $M_s$ and the martensitic structure is completed when temperature $M_f$ is reached.

As a result of the aforementioned structural transformations, certain mechanical characteristics can be predicted. In particular, the transformation of the structure of the material obtained by heating from temperature $A_s$ to temperature $A_f$ creates stresses in shape-memory material that cause the material to tend to recover a previously memorized shape if the material was deformed when in a martensitic phase.

Before being incorporated into the elastomeric material of fabric 13, metal straps 15 are subjected to a heat treatment that is selected based on the shape-memory characteristics for the particular material. The heat treatment is selected to obtain the benefits of the four temperatures characteristic of a shape-memory alloy, respectively $M_s$, $M_f$, $A_s$, and $A_f$. The heat treatment is also selected to obtain the benefits of a predetermined shape, for example, a length value "$l_0$."

Figure 3:
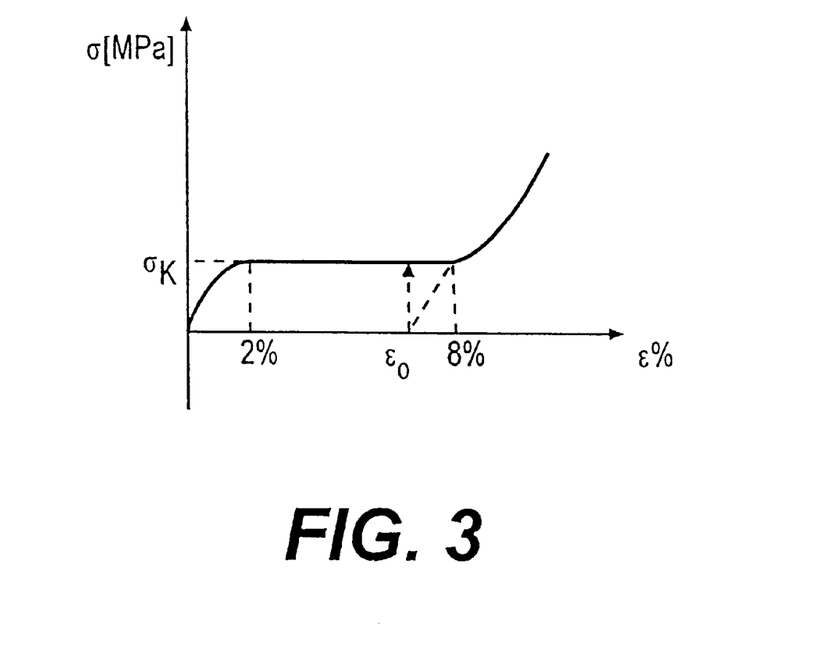
FIG. 3 is a stress-deformation diagram of a reinforcing metal strap in accordance with the present invention.

When metal strap 15 is cooled in the martensitic phase, strap 15 enters a stressed state and undergoes a pseudoplastic (pseudoelastic) elongation deformation. FIG. 3 graphically illustrates this principle. A tensile stress F is imparted at room temperature to metal strap 15 before it is incorporated into the elastomeric material. Based on FIG. 3, it is possible to predict the percent elongation to which metal strap 15 can be subjected. When the load ceases, metal strap 15 assumes a permanent percentage elongation whose value is determined by the following expression:

$$\epsilon_0 = (l - l_0)/l_0,$$

where "l" represents the value of absolute elongation of metal strap 15. The possible range of the percentage of elongation obtainable at constant load generally is between 1% and 8%. Percentage elongation $\epsilon_0$ may then be used subsequently in the vulcanization and operation phases of tire 1 to recover the predetermined shape by creating a force of contraction as a result of reaching temperatures $A_s$ and $A_f$, as explained below.

In the example considered, $\epsilon_0$ is equal to 4%, $A_s$ is equal to 60° C., and $A_f$ is equal to 80° C. Once subject to the initial deformation stress, metal straps 15 are then incorporated into elastomeric fabric 13 by known methods such as, for example, through a procedure using a rubberizing calender. The subsequent phases of tire manufacture, which concern the formation of the reinforcing belts 11, 12 and tread band 2 and also the assembly of these belts together with carcass 9 are known in the art.

Once all of the parts of tire 1 are assembled together, tire 1 is placed into a mold (preferably of the centripetal type, not shown), where tread band 2 is pressed and the vulcanization phase is carried out. During vulcanization, high-pressure air is introduced inside tire 1 and the temperature is increased to around 140° C.

Due to the high pressure applied to tire 1 during vulcanization, the two metallic belts 11, 12 expand. This expansion decreases the relative crossing angle between belts 11, 12 in such a way that tread band 2 moves toward the interior surface of the mold. The crown of the segments of the mold, on the other hand, is moved radially inward to imprint on tread band 2 the tread design engraved on their interior surfaces. Metal straps 15 exert a constraining force on the belts 11, 12 during vulcanization.

Figure 4:
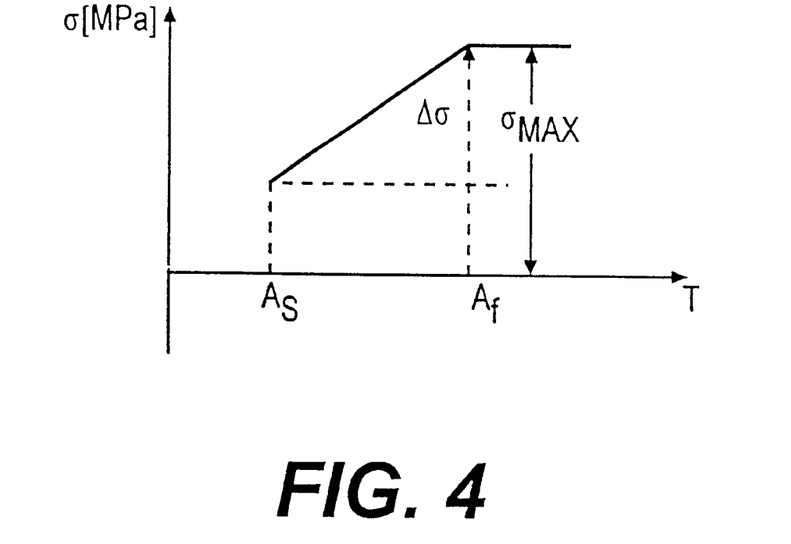
FIG. 4 is a stress-temperature diagram of an outermost belt in accordance with the present invention, having coils of metal straps oriented at zero degrees to the equatorial plane of the tire.

To clarify the functioning of metal straps 15 made from a shape-memory alloy, the behavior of the straps is represented in the graph of FIG. 4, which plots the relative stresses in metal straps 15 against the temperatures to which they are subjected.

Metal straps 15 are heated to temperature $A_s$ to begin the structural transformation from a martensitic state to an austenitic state. The austenitic transformation is completed when the temperature $A_f$ is reached. During the austenitic transformation between the temperatures $A_s$ and $A_f$, metal straps 15 tend to recover the predetermined shape corresponding to previously memorized elongation "$l_0$." However, metal straps 15 only recover the memorized shape to the extent permitted by the constraints to which they are subjected.

In practice, once metal straps 15 are incorporated into tire 1, since they cannot recover the predetermined shape corresponding to a previously memorized elongation $l_0$, they develop inward contraction stresses that press against underlying metal belts 11, 12. The maximum force $F_{max}$ that can be applied against underlying belts 11, 12 is 54 N, for example, and is applied when metal straps 15 are at temperature $A_f$. Therefore, during vulcanization, the annular coils of metal straps 15 oppose the expansion of underlying metal belts 11, 12. This results in an equilibrium, allowing the tire's tread band 2 to be molded.

Due to heating during normal operation of a tire, the tire undergoes several thermal cycles, particularly in high-speed conditions where centrifugal forces that tend to raise the temperature of the innermost belt layers 11, 12 are manifested. Under such operating conditions, metal straps 15 become heated and exert an inward compression stress on belts 11, 12 just as during the vulcanizing process. The compressive force applied by metal straps 15, as represented in FIG. 4, helps to minimize the effect of the outward bulging of the underlying belts 11, 12 as described above.

In additional embodiments of the present invention, tire 1 may have the following components:

1) Carcass 9
   incorporation of cords 9 in natural rubber with a hardness between 70 and 80 IRHD
   cords 9 of a Rayon material
   overall thickness of the incorporated ply between 1.1 and 1.25 mm
   construction of cords 9 of 1840×2 dtex
   density of cords 9=120 epd (ends per decimeter)
2) Internal belt 11 or 12
   incorporation of cords 14 in natural rubber, hardness between 60 and 85 IRHD
   construction of cords 14 of the type=2+1×0.28
   overall thickness of each fabric between 1.1 and 1.3 mm
   breaking load of cords 14 between 450 and 500 N
   Young's modulus of cords 14 between 190 and 200 Gpa
   density of cords 14 of a fabric=85 epd
   angle of crossing between cords 14 of two fabrics 11, 12=50 degrees
3) External belt 13
   metal strap 15 of various alloys, preferentially NiTi, a NiTiX alloy (where X is Fe, Cu, or Nb), FeNiCoTi, FeMnSi, CuZnAl, CuAlNi, CuAlBe, an alloy with a FeMnSi-base, or an alloy with a FeNiCo-base
   thickness "s" of metal strap 15 between 0.02 mm and 0.1 mm
   width of metal strap 15 between 1 mm and 5 mm
   distance "d" between the contiguous ends of metal straps 15 between 0.1 and 3.5 mm
   incorporated in natural rubber with a hardness between 65 and 85 IRHD
   thickness of fabric comprised between 0.1 and 0.4 mm
   stress $F_k$ of deformation of each metal strap 15 at room temperature
   (FIG. 3) between 50 and 150 Mpa
   value of elongation $\epsilon_0$ (FIG. 3) between 2 and 8%
   temperature value $A_s$ (FIG. 4) between 40 and 90° C.
   temperature value $A_f$ between 60 and 120° C.
   value of the stress of contraction F at temperature $(A_s+10°)$ between 50 and 100 Mpa
   value of maximum stress $F_{max}$ at temperature $A_f$ between 400 and 600 MPa In accordance with the present invention, other embodiments include the combination of fabrics 11, 12 with the third rubberized fabric comprising metal straps 15 made from a metal alloy of a shape-memory material. In still other embodiments, the carcass ply can be made with cords made from metal alloys of shape-memory material. In these last examples, the shape-memory material of cords can be those already mentioned for metal straps 15 in third fabric 13.

The present invention successfully solves many of the problems in the prior art. Part of the success of the present invention is due to metal straps 15, which react quickly and completely to temperature changes to take advantage of the properties of the shape-memory materials from which they are constructed. Part of the success of the present invention is also due to the stabilization of metal straps 15 in the incorporating fabric 13 with a high resistance to fatigue, as explained below.

The advantages of stabilizing metal straps 15 in fabric 13 were determined by compression testing conducted according to the following description. A test segment of metal strap made from a shape-memory alloy was placed around a rubber roll 250 mm in diameter. In the test, an alloy of 35 at % Ni—15 at % Cu—50 at % Ti was used. The test segment of metal strap was 0.03 mm thick, had a width of 3 mm, and a length of 600 mm. To simulate pressure on the piece of metal strap 15, two weights, each weighing 1000 grams, were applied one to each end of the strap. The roll was coated with crude rubber of the type usually used in belts. The rubber coating was about 2 mm thick.

The following table, Table #1, indicates in the first column the values of width "L" of the segment of metal strap 15 that was tested, and in the second column the values of compression $\Delta_x$ found in relation to the load applied to the ends of the segment of metal strap.

TABLE #1

| Width (mm) | METAL STRAP Compression $\Delta_x$ (relative to metal strap with width = 6 mm) |
|---|---|
| 0.50 | 1165 |
| 1.00 | 556 |
| 1.50 | 370 |
| 2.00 | 325 |
| 2.50 | 227 |
| 3.00 | 200 |
| 3.50 | 182 |
| 4.00 | 153 |
| 4.50 | 140 |
| 5.00 | 119 |
| 5.50 | 118 |
| 6.00 | 100 |

| Diameter (mm) | NYLON 6.6 CORD Compression $\Delta_x$ (relative to metal strap with width = 6 mm) |
|---|---|
| 0.25 | 1248 |
| 0.39 | 728 |

The results of the tests show practically negligible compression for a belt constructed according to the invention. In contrast, belts constructed according to the prior art exhibited a compression when compared with the results of the test with a metal strap.

Figure 5:
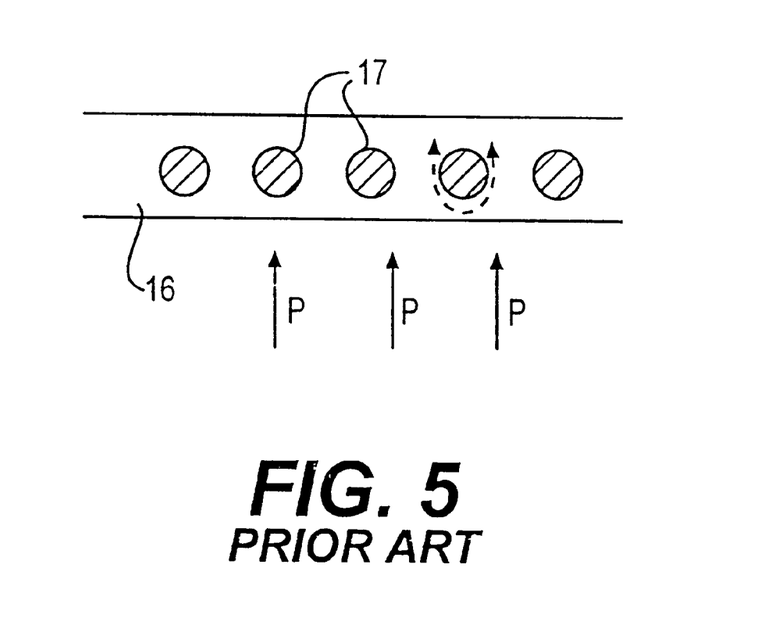
FIG. 5 is a cross-section of a layer of an outermost belt, showing zero-degree cords constructed in accordance with the prior art.

To summarize and clarify the results obtained, reference will be made to FIGS. 5–10. FIGS. 5 and 6 compare two rubberized fabrics incorporating reinforcing elements arranged circumferentially to a tire (not illustrated). Both were subjected to air pressure P acting from the inside of the fabric toward the outside in the direction indicated by the arrows. The range of air pressures used to inflate the tire varied as a function of the dimension and type of:application for the tire. Generally, however, the air pressures were within the range between 1.5 and 3.5 or more bars. FIG. 5 illustrates a known construction for the rubberized, reinforced fabric. There, fabric 16 incorporated nylon cords 17 with an external diameter of 0.39 mm.

FIG. 6 illustrates the construction of the rubberized, reinforced fabric according to the present invention. There, metal straps 15 were made of a shape-memory alloy. While each metal strap 15 may be separate from the others, it is also possible that the metal straps 15 can be wound in a spiral to form the coils illustrated in the cross-sectional diagram. In FIG. 6, metal straps 15 have a width "L" of 1 mm and a thickness of 0.03 mm.

FIGS. 5 and 6 compare the different ways in which the air pressure affects the reinforcing cords and the rubberized fabric. For the rubberized fabric known in the prior art, the force from the air pressure is easily directed around the nylon cords in the fabric because of their small transverse dimension. As a result, the cords in the prior art tend to exert a cutting action on the elastomeric material when in the presence of high air pressure P, as is illustrated in FIG. 5.

In contrast, the forces exerted by the air pressure when the belt is constructed according to the present invention produce a very different result. Because metal straps 15 present a considerably larger transverse dimension than nylon cords 17, the forces exerted by the air pressure do not create a situation where metal straps 15 tend to compress into or cut into the elastomeric material.

In practice, prior art nylon cords 17 tend to compress into the elastomeric material, while in the practice of the present invention, metal straps 15 tend to rise in a stable position in the elastomeric material. The same considerations are equally valid in the case in which the cords shown in FIG. 5 are made from a metal alloy of a shape-memory material with the same or similar diameter as nylon cords 17.

For the rubberized fabric in prior art constructions, the reinforcing elements manifest a tendency to compress inwardly. in any case, the tendency is for the reinforcing cords to assume an undesirable position in the geometry of the design. In contrast, in the structure of the present invention, the fabric manifests a geometric stabilization of the reinforcing metal straps 15. Therefore, a fabric constructed according to the present invention makes full use of the functional characteristics of the shape-memory material from which metal straps 15 are constructed so that the fabric may achieve the desired resistance to centrifugal forces at high driving speeds as well as control over the wires in the tire during vulcanization.

Figure 7:
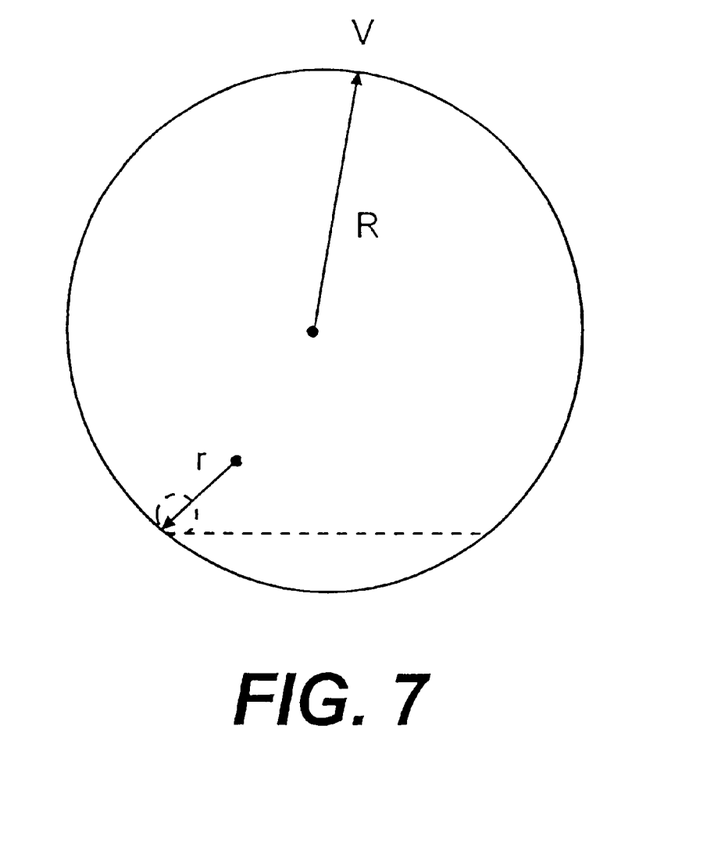
FIG. 7 is an illustrative schematic representation of the radii of curvature of a tire in an undeformed state and in the state between the undeformed portion and an imprint area.
Figure 8:
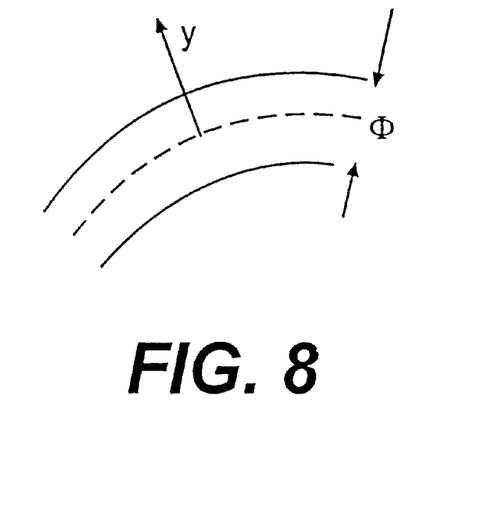
FIG. 8 shows the bending deformation of a portion of one of the zero-degree reinforcing elements constructed according to the present invention in an undeformed portion of a tire.

FIGS. 7 and 8 illustrate the mechanical characteristics of the high fatigue resistance of the zero-degree reinforcements according to the invention, relative to those found in the prior art. FIG. 7 shows schematically, with a circumferential line, the tire as it rolls on the ground. More particularly, FIG. 7 illustrates, for a good part of the circumference, the undeformed portion of the tire identified by a radius of curvature R and, in a broken line, the deformed portion corresponding to the area of the tire's imprint on the ground. The passage between the undeformed zone and the area of imprint is identified by a radius of curvature r, which is noticeably smaller than radius R.

In FIG. 8, nylon cords 17 of FIG. 5, each with a diameter of 0.39 mm, are represented in a partial longitudinal section of belt 16 in which they are incorporated. Nylon cords 17 are shown as they would be incorporated into the elastomeric fabric in the undeformed position of the tire, such as point V shown in FIG. 7. At point V, the cords are subject to bending, but the outermost cords, when compared with cords along the longitudinal axis corresponding to neutral axis η, are stretched tautly. As a result, the cords undergo a deformation, which can be expressed, as is known, by the following equation:

$$\epsilon = y/R$$

where y is the distance of the cord fibers from the neutral axis, measured according to axis y of the figure. The deformation value is greatest for the radially outermost fiber and assumes the value of the radius of the cord. R is the radius of curvature of the tire in the undeformed condition.

In the position of passage between the undeformed condition and the area of imprint, the cord assumes a new deformation determined by the following expression:

$$\epsilon = y/r$$

where the value of y in the numerator remains the same as compared with the undeformed example, but the values in the denominator are considerably lower, r being less than R. In one example, radius R was 250 mm while radius r was 25 mm. The preceding considerations result in an elevated cyclical deformation at each point in the cord in the passage between the undeformed position and the deformed position.

Alternatively, if the reinforcing cords in the fabric are constructed according to the teachings of the present invention, such as those illustrated in FIG. 6, and a fabric so constructed is incorporated into a tire, such as the one depicted in FIG. 7, it becomes readily apparent that there is a considerably smaller cyclical deformation of the metal straps in the zone of passage between the undeformed and the deformed configurations of the tire. The invention provides this advantage because the deformation is determined by the thickness of metal straps 15, which is smaller than the diameter of the prior art cords. The same result can be obtained with the cords of FIG. 5 including shape-memory alloys materials.

In fact, the present invention contemplates a construction for metal straps 15 where the thickness of straps 15 is considerably less than the width of straps 15. For example, with a fabric thickness of at most 0.4 mm, preferably 0.3 mm, the thickness of metal straps 15 is expected to be between 0.02 and 0.1 mm.

In practice, the mechanical characteristics of a fabric constructed according to the teachings of the present invention are realized because the reinforcing elements have considerably smaller cyclic bending deformation stresses than the reinforcing cords taught by the prior art. As a result, this increases the fabric's resistance to fatigue when a fabric made according to the present invention is compared with fabrics made according to the teachings of the prior art. Therefore, as a result of the mechanical characteristics which can be derived from the practice of the present invention, it is possible to create a tire incorporating reinforcing elements made from a shape-memory alloy that overcomes a number of the failings present in tires constructed according to the prior art.

Moreover, the weight of a fabric constructed according to the present invention can be considerably reduced when compared with fabrics constructed according to the prior art. For example, a fabric, such as the one illustrated in FIG. 5, has an overall thickness of 0.7 mm, far greater than the thickness of the fabric of FIG. 6, which shows a fabric with a thickness 0.3 mm. This demonstrates that fabrics made in accordance with the present invention use less rubber and are, therefore, lighter than prior art fabrics. The automotive industry has had a long-standing demand for lighter tire constructions.

Figure 9:
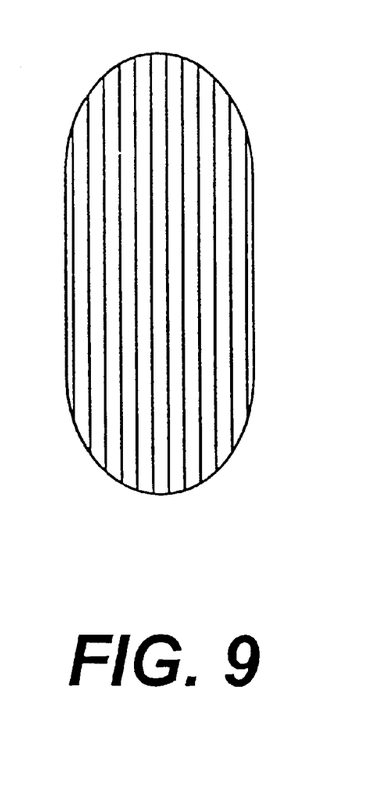
FIG. 9 shows the direction of the zero-degree reinforcing elements in the area of imprint of a tire constructed according to the present invention.
Figure 10:
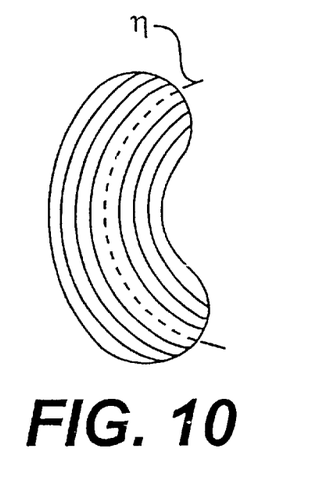
FIG. 10 shows the area of imprint of FIG. 9 as a result of a "bean" deformation, which is the type of deformation to which a tire may be subjected when in a turn or on a curve.

As mentioned, a fabric constructed according to the teachings of the present invention also offers improved resistance to the stresses occurring to the belts in the imprint area. In fact, it has been found that the behavior of belt fabrics, at the area of imprint, can be represented schematically, as is done in FIGS. 9 and 10. FIG. 9 shows the imprint of a tire when the tire is running in a straight line while FIG. 10, a bean-shaped imprint, shows the imprint of the tire when running around a curve.

In the representation of FIG. 9, the zero-degree reinforcing elements have a rectilinear progression. However, the zero-degree reinforcing elements shown to the right of the neutral axis η in FIG. 10 undergo compression stresses. The reinforcing elements that carry the highest loads collapse in the imprint area because the stress levels are high enough to cause deformation. However, on the remainder of the tire, where there is no imprint, the reinforcing elements do not collapse because they are interposed between the metal belts of the internal layers 11, 12 that are themselves not deformable.

Figure 11:
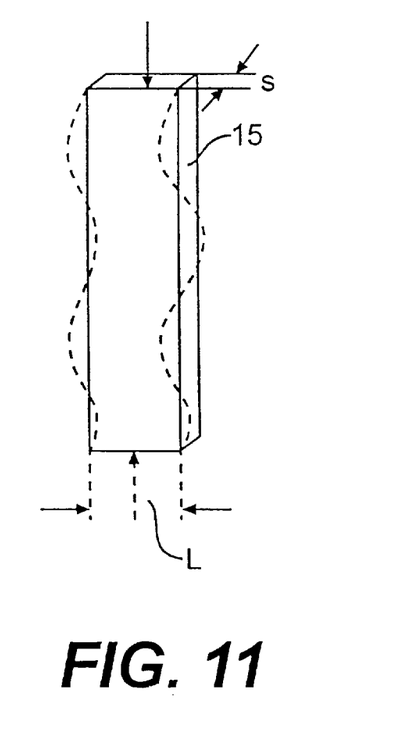
FIG. 11 is a schematic representation of a portion of a compression-loaded, zero-degree metal strap and the possible configuration of that strap when deformed to the point of collapse.

In contrast, when the reinforcing elements of the present invention are studied, it can be observed that a collapse of one of the elements, as shown in FIG. 11, would require compressive stresses that are higher than occur frequently in practice. In fact, the compressive stresses that are high enough to result in a "sideways" deformation of such a reinforcing element would have to be large enough to collapse a metal strip with a width between 1 mm and 5 mm. A cord from the prior art, such as the one illustrated in FIG. 5 with a diameter of 0.39 mm, whether constructed from nylon or metal, is much more likely to collapse under the peak load in the imprint area than a reinforcing element that is three to fifteen times thicker, as in the construction of the present invention. Therefore, metal strap 15 according to the present invention is able to develop the characteristics of the shape-memory materials in operation when so required, even after having undergone cyclical stresses of compression, as represented schematically in FIG. 10.

Additional advantages and modification will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A tire, comprising:
   a carcass;
   a tread band on the carcass;
   a belt, positioned between the tread band and the carcass, including at least one layer of rubberized fabric; and
   at least one reinforcing metal strap in the at least one layer of rubberized fabric;
   wherein the at least one reinforcing metal strap is made of a shape-memory material oriented at about 0° to an equatorial plane of the tire, wherein the at least one reinforcing metal strap has a width of no less than about 1 mm, wherein the at least one reinforcing metal strap has a first thickness of no greater than about 0.1 mm, and wherein the at least one reinforcing metal strap has coils disposed side-by-side in a direction substantially perpendicular to a radius of the tire.

2. The tire of claim 1, wherein the at least one layer of rubberized fabric has a second thickness of no more than about 0.4 mm.

3. The tire of claim 1, wherein the width of the at least one reinforcing metal strap is between about 1 mm and about 5 mm.

4. The tire of claim 1, wherein the first thickness of the at least one reinforcing metal strap is between about 0.02 mm and about 0.1 mm.

5. The tire of claim 1, wherein the at least one reinforcing metal strap comprises a plurality of separate reinforcing metal straps disposed in a side-by-side arrangement, and wherein a first distance between the separate reinforcing metal straps is between about 0.1 mm and about 3.5 mm.

6. The tire of claim 1, wherein the at least one reinforcing metal strap is a continuous metal strap wound helically with a second distance between adjacent turns of the continuous metal strap between about 0.1 mm and about 3.5 mm.

7. The tire of claim 1, wherein the at least one reinforcing metal strap has the first thickness, wherein the coils are axially displaced from one another a third distance, wherein the at least one layer of rubberized fabric has a second thickness, and wherein a relationship between the first thickness, the third distance and the second thickness is identified by:

$$\text{first thickness} \leq \text{third distance} \leq \text{second thickness}.$$

8. The tire of claim 7, wherein the third distance is between about 0.1 mm and about 3.5 mm.

9. The tire of claim 7, wherein the first thickness is between about 0.02 mm and about 0.1 mm.

10. The tire of claim 1, wherein the at least one layer of rubberized fabric comprises natural rubber with a hardness between about 65 and about 85 International Rubber Hardness Degrees (IRHD).

11. The tire of claim 1, wherein the shape-memory material is: a NiTi alloy; a NiTiX alloy, where X is Fe, Cu, or Nb; a CuZnAl alloy; a CuAlNi alloy; a CuAlBe alloy; an FeNiCoTi alloy; an FeMnSi alloy; an alloy with an FeMnSi-base; or an alloy with an FeNiCo-base.

12. The tire of claim 1, wherein the at least one reinforcing metal strap is in a heat-treated condition resulting in a predetermined memorized length.

13. The tire of claim 1, wherein the at least one reinforcing metal strap, at room temperature and in a martensitic state, when subjected to a tensile stress from an unvaried load, exhibits a percentage elongation between about 1% and about 8%.

14. The tire of claim 1, wherein the at least one reinforcing metal strap recovers a previously memorized shape by developing forces of contraction between a start temperature $A_s$ and a final temperature $A_f$, wherein
   $A_s$ begins a transformation of a structure of the at least one reinforcing metal strap from a martensitic state to an austenitic state, and
   $A_f$ completes the transformation of the structure of the at least one reinforcing metal strap from the martensitic state to the austenitic state.

15. The tire of claim 14, wherein $A_s$ is between about 40° C. and about 90° C.

16. The tire of claim 14, wherein $A_f$ is between about 60° C. and about 120° C.

17. The tire of claim 14, wherein a stress of contraction of the at least one reinforcing metal strap at temperature ($A_s$+10° C.) is between about 50 MPa and about 100 MPa.

18. The tire of claim 14, wherein a maximum stress of the at least one reinforcing metal strap at temperature $A_f$ is between about 400 MPa and about 600 MPa.

19. The tire of claim 1, wherein the at least one reinforcing metal strap has a stress deformation between about 50 MPa and about 150 MPa at room temperature.

* * * * *